United States Patent Office 3,353,982
Patented Nov. 21, 1967

3,353,982
PROCESS FOR MAKING A FILTER
Emil Blaha, Montgomery County, Pa., assignor to Selas Corporation of America, a corporation of Pennsylvania
No Drawing. Filed May 1, 1964, Ser. No. 364,315
5 Claims. (Cl. 117—8)

The present invention relates to filters, and more particularly to a ceramic or metal supported metal filter with extremely fine pores.

A porous metal membrane of the type with which this invention is concerned is described in my copending application, Ser. No. 326,202, filed Nov. 26, 1963, now Patent No. 3,287,112. The membrane described in that application must be supported by a separate support when in use. The invention of this application relates to the formation of the membrane on and as an integral part of a porous support of suitable shape and material.

It is an object of the invention to provide a method of making a micro-porous metallic filter element that is integrally formed upon and supported by a ceramic member. It is a further object of the invention to provide a rigidly supported metal filter.

In practicing the invention, the ceramic member is prepared to receive the metal, and is then dipped into a metal solution of which the actual filter is made. The member is then fired to form the metal filter in situ.

First, a porous ceramic member, which may be a disc or candle, having a pore size of from 10 to 100 microns is covered with a material which will fill its pores on the surface and will not react with the ceramic. Such a material, by way of example, is whiting, a powdered form of calcium carbonate.

The whiting may be applied by dipping the ceramic member in a solution of whiting or by wetting the member and applying dry whiting to it. In either case the member is dried and then rubbed to expose a smooth surface with at least the surface pores of the ceramic filled with whiting.

The metal of which the actual filter is formed is prepared in the manner set forth in detail in the above mentioned copending application. For purposes of description in this application, silver will be the metal of which the filter is made, and the description of mixing and baking will be of one form only, it being understood that any of the forms of said copending application may be used.

A finely powdered silver oxide is mixed with a binder such as acrylate or cellulose acetate in proportions of 2 to 10 parts by weight of binder to 80 to 98 parts by weight of the silver oxide. A solvent in which the binder can be dissolved, such as acetone or ketone, is mixed with the dry ingredients until a thin liquid is obtained. The thickness of the liquid will depend upon the thickness of the metal coating to be placed on the ceramic backing, but will ordinarily be of the thickness of paint, such as dipping lacquer.

The ceramic support is dipped into the metal-binder solution to place a thin, even coat of solution on the support. The solvent is then permitted to evaporate, leaving a thin, even coating of dry metal oxide in binder on the support. Ordinarily the solution will be of a consistency to leave a layer on the support of about 0.002" thickness.

The support carrying the coating is then heated to a temperature and in an atmosphere in which the metal oxide decomposes with the oxygen being driven off. With silver oxide this temperature will be slightly above 300° C. During the heating, the binder is also burned out. The resulting film that remains on the support is a thin, porous film or membrane of substantially pure silver which is integrally united to the support, and which has pores of one micron or less in size.

After the metal film is complete, the entire structure is treated to remove the whiting, or other filler, from the pores of the ceramic. This can be a leaching operation. If the filler is whiting, the liquid used may be acetic acid which will not affect the ceramic support or the silver film on it. Since both the film and the support are porous, the liquid can be forced through them to dissolve and carry away the filler. The ceramic having the larger pores, it is preferred to supply the leaching liquid from the metal side. After the filler has been removed the filter is washed, sterilized and ready for use.

While the invention has been described as using a porous ceramic as the support for the metal, and is ordinarily preferred, it will be apparent that other porous material such as a screen can be used as a support.

The filter produced by the present invention has a metal filtering surface, with pores a fraction of a micron in size. Since the metal layer is so thin the flow rate through the filter is high. The porous ceramic backing, with pores substantially larger than those in the metal, has a higher flow rate than the metal and is strong and rugged enough to support the metal under severe conditions of use. In most applications the support will be in the shape of a disc or a candle.

While in accordance with the provisions of the statutes I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. The method of making a filter which comprises providing a rigid porous support having pores larger than those of the finished filter and having a surface the shape the filter is to take, filling the pores on said surface with a filler, placing a film of a metal oxide and a binder on said surface of a thickness substantially equal to that of the finished filter, heating the support and film to a temperature sufficient to burn out the binder and decompose the oxide to substantially pure metal, thereby to produce on said support an integral thin, porous metal film, and leach out the filler from the pores of said support.

2. The method of making a filter which comprises filling the pores on at least one surface of a porous support with a filler, smoothing said surface so that at least the pores are filled, placing on the surface of the support a thin layer of a solution of metal oxide, a binder and a solvent for the binder, drying the solution by evaporation of the solvent to leave a film of metal and binder thereon, firing the support and film to burn out the binder and decompose the metal oxide, thereby leaving a porous layer of metal fused to the surface of the support, and dissolving the filler from the support.

3. The method of making a filter which comprises preparing the surface of a porous ceramic support by filling the pores on said surface with a filler and smoothing the surface, placing a thin film of a metal oxide in a binder on said surface, heating the support and film to burn out the binder and decompose the oxide thereby to create a porous metal film permanently attached to said surface, and removing the filler from the pores of said support by a solvent that is chemically inactive with respect to the support and the metal film.

4. The method of making a filter which comprises preparing one surface of a porous support of the shape the filter is to have by closing the pores at said surface with a filler and smoothing said surface, placing on said surface a thin, smooth layer of silver oxide in a binder, heating said support with said layer thereon to a temperature sufficient to burn out the binder and to decompose the silver oxide to a layer of porous, substantially pure silver permanently affixed to said support, and leaching the filler from the pores of said support.

5. The method of making a supported metal filter which comprises preparing a porous ceramic support having pores of a predetermined size by filling the pores on at least one surface thereof with a filler and smoothing said surface, coating said surface with a film of a solution consisting of powdered silver oxide, a binder and a solvent for the binder, permitting the solvent to evaporate, heating the support to burn out the binder and decompose the silver oxide to a porous film of substantially pure silver integrally attached to the support with the pores in the silver smaller than the pores in said support, and leaching the filler from the pores of said support.

References Cited

UNITED STATES PATENTS

| | | | |
|---|---|---|---|
| 2,773,844 | 12/1956 | Carlson et al. | 117—123 X |
| 3,051,592 | 8/1962 | Woerner | 117—123 X |

FOREIGN PATENTS

| | | |
|---|---|---|
| 626,357 | 7/1949 | Great Britain. |
| 1,177,879 | 9/1964 | Germany. |

ALFRED L. LEAVITT, *Primary Examiner.*

E. B. LIPSCOMB, *Assistant Examiner.*